United States Patent
Ono et al.

(10) Patent No.: US 11,218,426 B2
(45) Date of Patent: Jan. 4, 2022

(54) PACKET PROCESSING SYSTEM AND METHOD

(71) Applicant: Nippon Telegraph and Telephone Corporation, Tokyo (JP)

(72) Inventors: Kotaro Ono, Tokyo (JP); Ryota Ishibashi, Tokyo (JP); Takeshi Kuwahara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 6 days.

(21) Appl. No.: 16/966,790

(22) PCT Filed: Feb. 7, 2019

(86) PCT No.: PCT/JP2019/004386
§ 371 (c)(1),
(2) Date: Jul. 31, 2020

(87) PCT Pub. No.: WO2019/156155
PCT Pub. Date: Aug. 15, 2019

(65) Prior Publication Data
US 2020/0358720 A1    Nov. 12, 2020

(30) Foreign Application Priority Data

Feb. 9, 2018  (JP) .............................. JP2018-021850

(51) Int. Cl.
*H04L 12/861*    (2013.01)
*H04L 29/06*    (2006.01)
(Continued)

(52) U.S. Cl.
CPC .............. *H04L 49/90* (2013.01); *H04L 45/38* (2013.01); *H04L 45/74* (2013.01); *H04L 65/60* (2013.01);
(Continued)

(58) Field of Classification Search
CPC ..... H04L 63/0263; H04L 69/22; H04L 49/90; H04L 45/38; H04L 45/74; H04L 65/60;
(Continued)

(56) References Cited

U.S. PATENT DOCUMENTS

2015/0156287 A1* 6/2015 Itoh ........................ H04L 69/22
370/392
2017/0063706 A1* 3/2017 Suzuki ................ H04L 63/0263

FOREIGN PATENT DOCUMENTS

JP          2005229168          8/2005

* cited by examiner

*Primary Examiner* — Vinncelas Louis
(74) *Attorney, Agent, or Firm* — Fish & Richardson P.C.

(57) ABSTRACT

A packet processing system and method for enabling real-time packet processing while preventing an unnecessary delay increase are provided. A terminal 10-1 and a terminal 10-2 that transmit different types of packets in real time, a communication device 30 that processes packets transmitted by the terminal 10-1, and a packet processing device 100 disposed in a communication path of the packet from the terminal 10-1 and the terminal 10-2 to the communication device. The packet processing device 100 determines a processing method for the packets received from the terminal 10-1 based on the packets received from the terminal 10-2, creates a processing method determination table, and creates a processing method list. The terminal information packet processing unit 124 processes the packets received from the terminal 10-1 per packet unit based on the processing method list.

12 Claims, 20 Drawing Sheets

(51) Int. Cl.
*H04L 29/08* (2006.01)
*H04N 21/43* (2011.01)
*H04N 21/439* (2011.01)
*H04N 21/44* (2011.01)
*H04L 12/741* (2013.01)
*H04N 21/2187* (2011.01)
*H04L 12/721* (2013.01)

(52) U.S. Cl.
CPC ............ *H04L 69/28* (2013.01); *H04L 69/324* (2013.01); *H04N 21/2187* (2013.01); *H04N 21/4302* (2013.01); *H04N 21/4392* (2013.01); *H04N 21/44004* (2013.01)

(58) Field of Classification Search
CPC ... H04L 69/28; H04L 69/324; H04N 21/2187; H04N 21/4302; H04N 21/4392; H04N 21/44004
See application file for complete search history.

| TIME | PROCESSING METHOD DETERMINATION RESULTS |
|---|---|
| $\frac{1}{fx}$ | (EXAMPLE) TRANSMIT |
| $\frac{2}{fx}$ | (EXAMPLE) DISCARD |
| $\frac{3}{fx}$ | (EXAMPLE) DISCARD |
| $\frac{4}{fx}$ | |
| $\frac{5}{fx}$ | |
| ... | ... |

Fig. 4

| TIME | PROCESSING METHOD DETERMINATION RESULTS |
|---|---|
| $\frac{1}{fx}$ | (EXAMPLE) TRANSMIT |
| $\frac{2}{fx}$ | (EXAMPLE) DISCARD |
| $\frac{3}{fx}$ | (EXAMPLE) DISCARD |
| $\frac{4}{fx}$ | |
| $\frac{5}{fx}$ | |
| ... | ... |

Fig. 9

| TIME | PROCESSING METHOD DETERMINATION RESULTS |
|---|---|
| $\frac{1}{fa}$ | (EXAMPLE) TRANSMIT |
| $\frac{2}{fa}$ | (EXAMPLE) DISCARD |
| $\frac{3}{fa}$ | |
| ... | ... |

| TIME | PROCESSING METHOD DETERMINATION RESULTS |
|---|---|
| $\frac{1}{fb}$ | (EXAMPLE) TRANSMIT |
| $\frac{2}{fb}$ | (EXAMPLE) DISCARD |
| $\frac{3}{fb}$ | (EXAMPLE) DISCARD |
| ... | ... |

Fig. 14

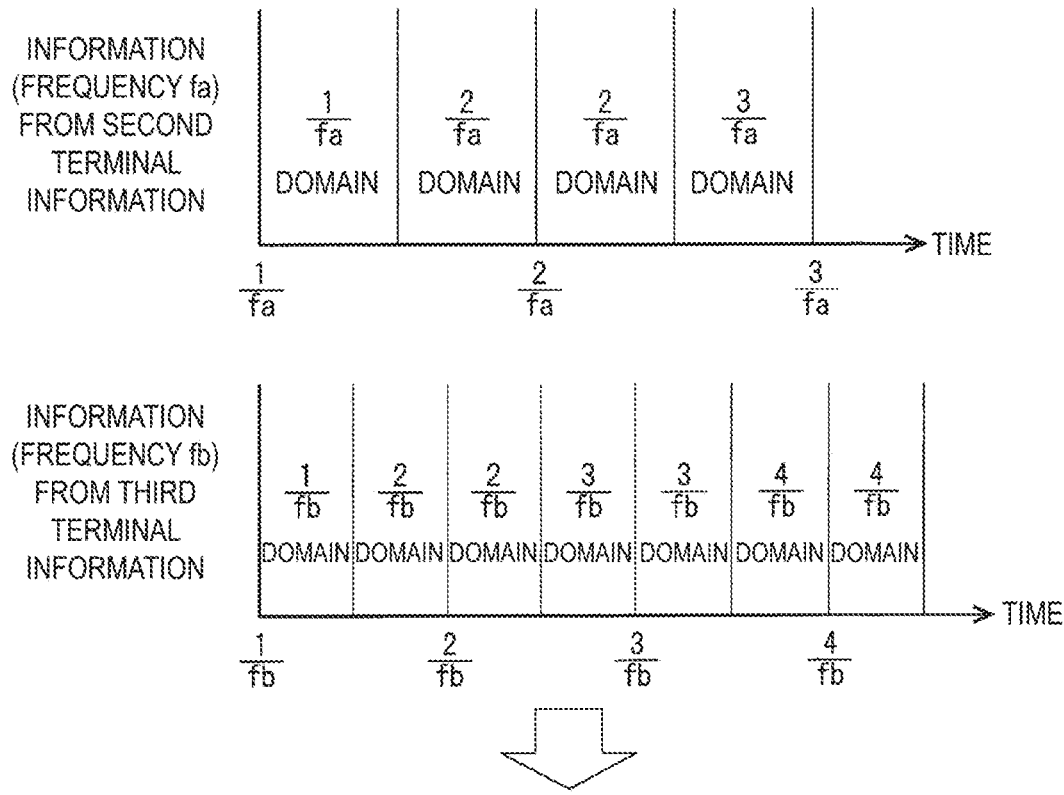
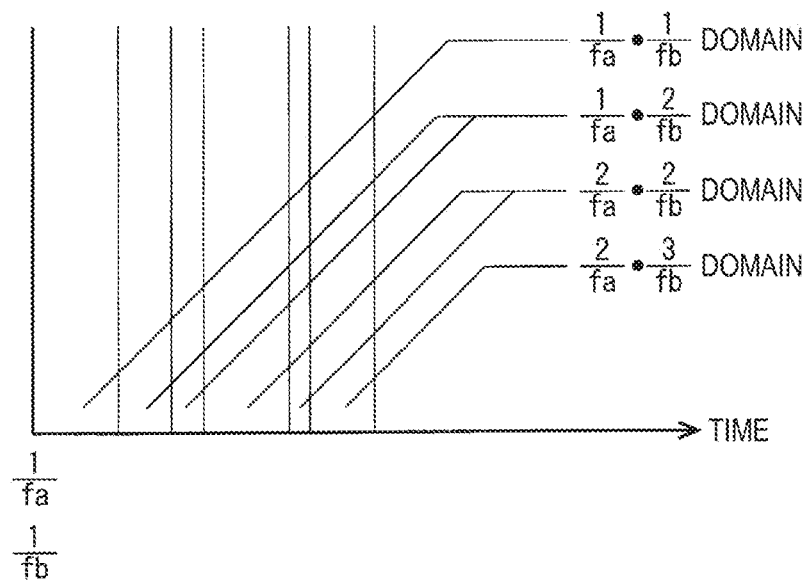
Fig. 15

| PROCESSING METHOD DETERMINATION RESULT FOR IMAGE INFORMATION PACKETS ACCORDING TO FIRST STATE INFORMATION | PROCESSING METHOD DETERMINATION RESULT FOR IMAGE INFORMATION PACKETS ACCORDING TO SECOND STATE INFORMATION | PROCESSING METHOD DETERMINATION RESULT FOR IMAGE INFORMATION PACKETS |
|---|---|---|
| DISCARD | DISCARD | DISCARD |
| DISCARD |  | DISCARD |
| DISCARD | TRANSMIT | DISCARD |
| TRANSMIT | DISCARD | DISCARD |
| TRANSMIT |  | TRANSMIT |
| TRANSMIT | TRANSMIT | TRANSMIT |
|  | DISCARD | DISCARD |
|  | TRANSMIT |  |
|  |  | DISCARD |

Fig. 20

PACKET PROCESSING SYSTEM AND METHOD

CROSS-REFERENCE TO RELATED APPLICATIONS

This application is a National Stage application under 35 U.S.C. § 371 of International Application No. PCT/JP2019/004386, having an International Filing Date of Feb. 7, 2019, which claims priority to Japanese Application Serial No. 2018-021850, filed on Feb. 9, 2018. The disclosure of the prior application is considered part of the disclosure of this application, and is incorporated in its entirety into this application

TECHNICAL FIELD

The present invention relates to a system and method for processing a packet transmitted by a certain terminal based on information of packets transmitted by another terminal when a communication device processes the packet transmitted by the certain terminal in a system having a configuration in which the communication device is connected to a plurality of terminals via a network.

BACKGROUND ART

With the development of the Internet of things (IoT), technology and services for utilizing various types of terminals connected to a network (NW) and large amounts of information acquired by the terminals have been examined. In the IoT, effective utilization of a large number of sensors (for example, a microphone that acquires audio information, a camera that acquires image information, a measurement device that acquires environmental information such as temperature, humidity, and luminance, and a measurement device that acquires operational information such as a velocity, direction, and position of a machine) connected to the NW has become an issue. A utilization method for, for example, not only using information that can be acquired by individual terminals connected to the NW, such as sensor information in the above example, but also using information of a plurality of terminals in combination, or performing statistical processing and analysis on the information has been examined.

Further, when a terminal can transmit or receive information to or from the outside via a NW, decentralization of terminal functions utilizing external resources can be realized in the related art. For example, a control function of a terminal disposed in the terminal itself or an NW closed at a site at which the terminal is installed may be disposed in a cloud or an edge of an NW close to the terminal. When some of the terminal functions are gathered and disposed on the cloud or on the edge of the NW close to the terminal, enhanced functions for providing intelligent terminal control or high value-added services need not be implemented in individual terminals. Thus, it is possible to develop services utilizing enhanced functions while reducing costs of a terminal itself or maintenance and operation costs for maintenance.

When the use of a combination of separate pieces of information on the cloud or at the edge of the NW is conceived, the information being acquired in real time by a plurality of terminals, though depending on the method of the use, a temporal corresponding relationship between the plurality of pieces of information may have to be established in some cases. For example, when packets of information that certain terminals (terminals 1) transmit in real time is to be processed using information that other terminals (terminals 2) transmit in real time, it must be considered that a temporal corresponding relationship needs to be established between a certain packet of information of the terminals 1 and a corresponding information of the terminals 2.

In video streaming such as television broadcasting in which audio information acquired by a microphone and image information acquired by a camera are used, a technology (lip synching) for synchronizing the audio information with the image information is adopted so that playback content in a device for receiving and playing back the audio information and the image information is not unnatural. In lip synching, a playback device temporarily buffers the audio information and image information, which are acquired separately, for the purposes of synchronization between playback timings of the audio information and the image information and avoidance of an influence of a delay jitter. The playback device delays the audio information according to the playback of the image information, which requires a processing time, by referring to timestamps of packets of the audio information and packets of image information that are being buffered, to synchronize the audio information with the image information (see Patent Literature 1).

CITATION LIST

Patent Literature

Patent Literature 1: JP 2005-229168

SUMMARY OF THE INVENTION

Technical Problem

When the use of a combination of separate pieces of information on the cloud or at the edge of the NW is conceived, the information being acquired in real time by a plurality of terminals, though depending on the method of the use, a temporal corresponding relationship between the plurality of pieces of information may have to be established in some cases. In this case, when the related art as described in Patent Literature 1 is used, separate information acquired in real time by a plurality of terminals is temporarily buffered in any case, and there is a problem that a real-time property of information is impaired. This problem occurs because respective pieces of information are buffered in a fixed manner even when information that may become ready for processing earlier in time in many cases (audio information in Patent Literature 1) and information that may become ready for processing later in time in many cases (image information in Patent Literature 1) become ready for processing simultaneously or when a difference in time is smaller than previously assumed. Further, when the related art as described in the Citation List is used in a communication device in an NW that transfers respective pieces of information, a fixed delay will be inserted between reception and retransmission of information, leading to an increase in an unnecessary delay.

The present invention has been made in light of the foregoing, and an object of the present invention is to provide a packet processing system and method for enabling real-time packet processing while preventing an unnecessary delay increase.

Means for Solving the Problem

To achieve the above object, the present invention is a packet processing system including a first terminal and a second terminal configured to transmit different data types of packets in real time, and a reception device configured to receive the packets transmitted from the first terminal, wherein the packet processing system includes a packet processing device disposed on a communication path of packets from the first terminal to the reception device, the first terminal and the second terminal include a packetization apparatus configured to append a time, at which a packetization process has been performed, to data, and packetize the data, the packet processing device includes a packet processing method determination apparatus configured to determine a method of processing packets received from the first terminal per packet unit based on data content of a packet each time the packet is received from the second terminal, and output the processing method as a determination result associated with time information of the packet; a processing method determination result management apparatus configured to store the determination result as a packet processing method determination table each time the determination result is received from the packet processing method determination apparatus, and generate and store a processing method list in which a method of processing, per packet unit, packets received from the first terminal according to a predetermined rule based on the determination method determination table is associated with time information; and a packet processing apparatus configured to inquire of the processing method determination result management apparatus about a processing method for a packet each time the packet is received from the first terminal, and process the packet based on the processing method acquired from the processing method determination result management apparatus, and the processing method determination result management apparatus responds to the packet processing apparatus with the processing method associated with time information by referring to the processing method list based on the time information of the packet in response to the inquiry from the packet processing apparatus.

Effects of the Invention

According to the present invention, with the packet processing device, it is possible to establish a temporal corresponding relationship between the packets of the information transmitted in real time from the terminals and the information transmitted in real time from other terminals, and then perform processing in real time using such information. Thus, because it is possible to reduce a transfer delay as much as possible, thereby minimizing impairment of a real-time property, it is possible to decrease a delay of an overall system in an end-to-end view, to thus solve a problem of an increase in an unnecessary delay when related art as described in Patent Literature 1 is used, and to enable real-time packet processing using the information associated in the temporal corresponding relationship. Because the packet processing in the present invention is processing at a packet level rather than processing of a payload of a packet on the processed side, it is possible to process information with a large processing load, such as image information, in real time with a small load.

BRIEF DESCRIPTION OF DRAWINGS

FIG. 4 is an example of a processing method determination table.

FIG. 9 is an example of a processing method determination table.

FIG. 14 illustrates an example of a processing method determination table when there are a plurality of packets which are the basis of a determination.

FIG. 15 illustrates an example of a processing method list when there are a plurality of packets which are the basis of a determination.

FIG. 20 illustrates an example of a rule that is used in determining a method of processing a processing method list.

DESCRIPTION OF EMBODIMENTS

Figure 1:
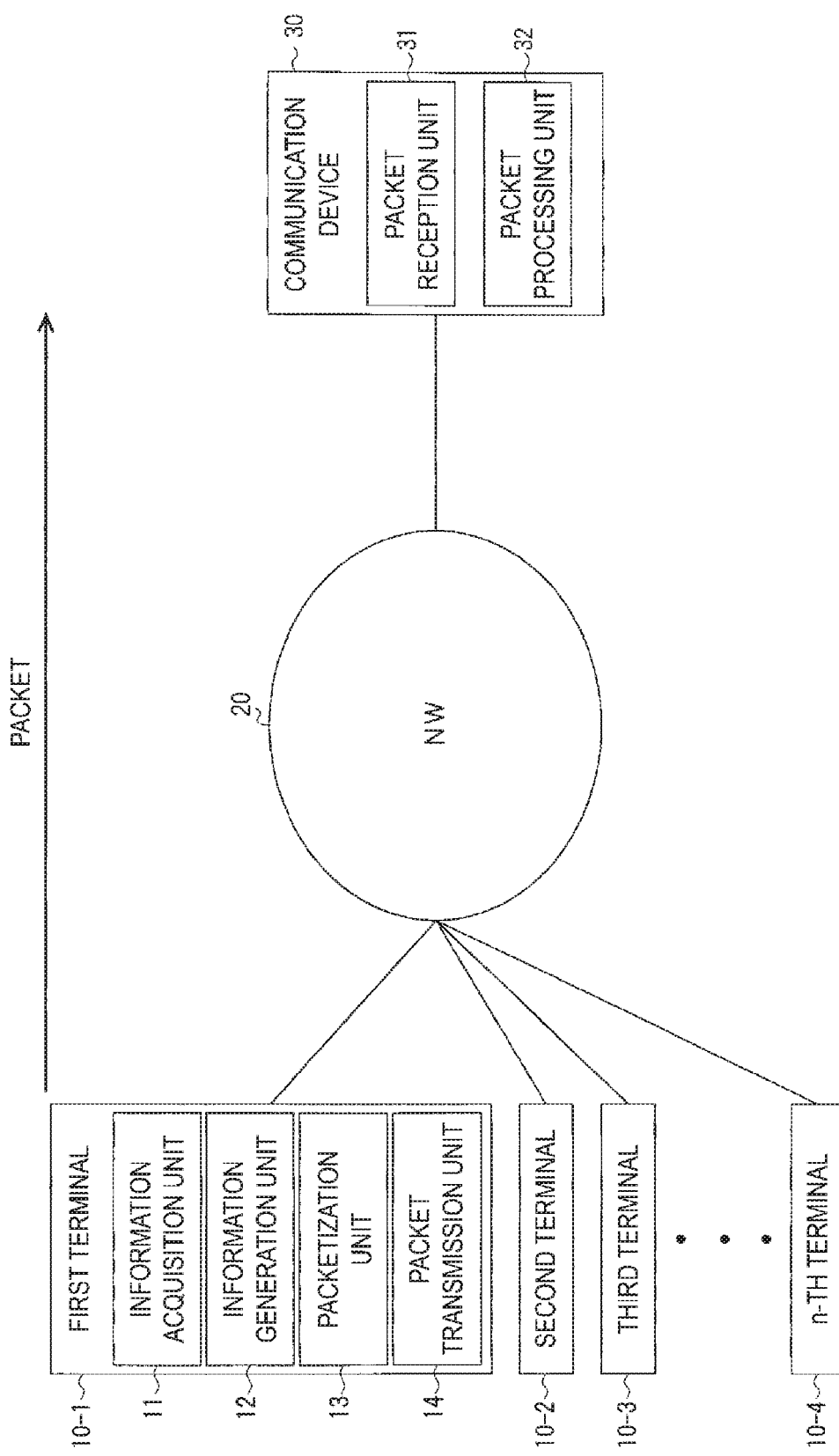
FIG. 1 is a schematic diagram of a configuration of a system that is the basis of the present invention.
Figure 2:
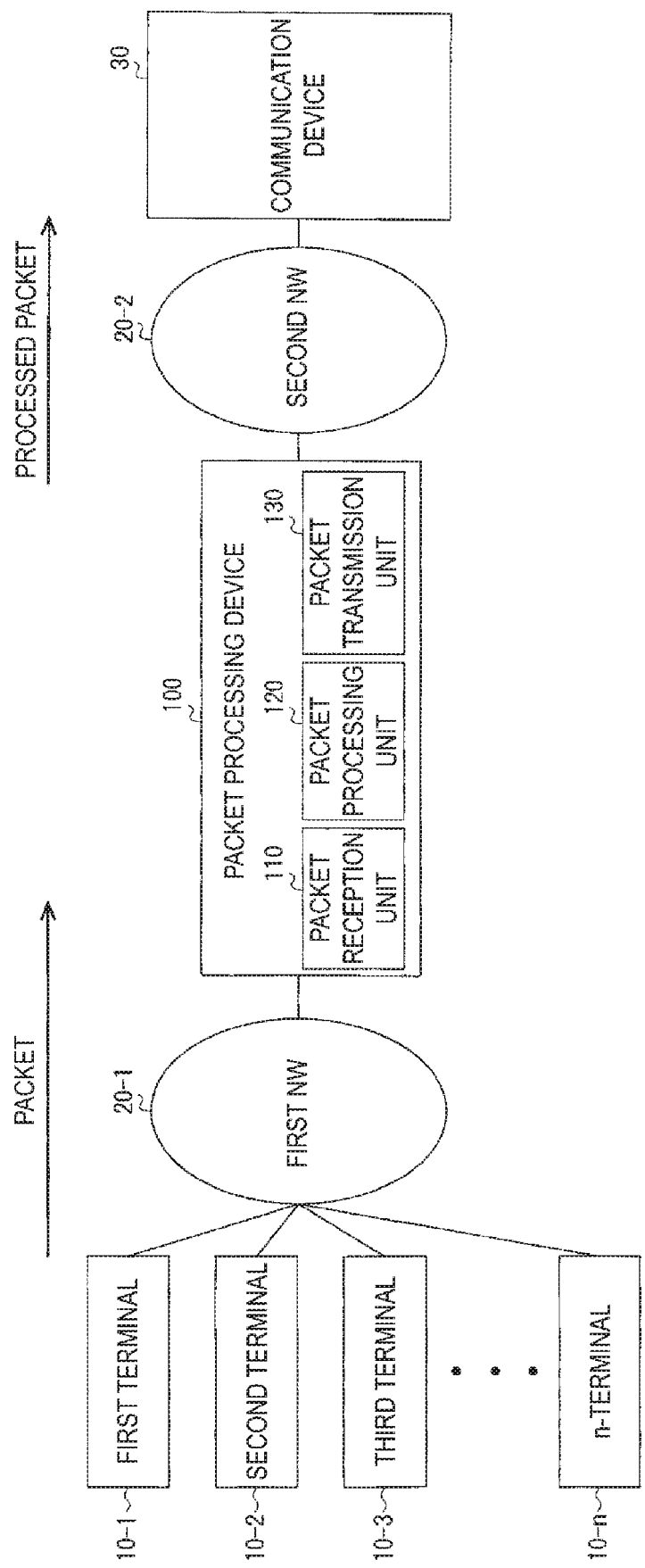
FIG. 2 is a schematic configuration diagram of a packet processing system according to the present invention.

A packet processing system according to an embodiment of the present invention will be described with reference to the drawings. In the present invention, a heterogeneous packet utilization type packet processing device (hereinafter simply referred to as a "packet processing device") is used as a means for solving the above problem. FIG. 1 is a schematic configuration diagram of a system serving as the basis of the present invention, and FIG. 2 is a schematic configuration diagram of the present system in which a packet processing device according to the present invention is disposed on an NW. In the present application, a plurality of the same types of devices and configurations are denoted with common main reference signs, and branch numbers are added after the main reference signs to refer to the respective devices and configurations individually. Further, only the main reference signs are used to collectively refer to the plurality of same types of devices and configurations. In the drawings, the numbering corresponding to the branch numbers is given before the names so that each device and configuration can be easily referred individually.

As illustrated in FIG. 1, each terminal 10 includes an information acquisition unit 11 configured to acquire information, an information generation unit 12 configured to generate information, a packetization unit 13 configured to periodically packetize information acquired by the information acquisition unit 11 and information generated by the information generation unit 12, and a packet transmission unit 14 configured to transmit the packetized packet to the outside connected to an NW 20 in real time. Here, the packetization unit 13 appends a time of packetization as a timestamp. Each terminal 10 transmits different data types of packets in real time. The terminal 10 may include only one of the information acquisition unit 11 or the information generation unit 12.

The communication device 30 includes a packet reception unit 31 configured to receive a packet transmitted from each terminal 10 connected to the NW 20, and a packet processing unit 32 configured to perform packet processing including retransmission of the packet and processing of packetized information.

The packet processing device 100 according to the present invention is disposed on a communication path of a packet from each terminal 10 to the communication device 30. As illustrated in FIG. 2, each terminal 10 is connected to an NW 20-1, the communication device 30 is connected to an NW 20-2, and a packet processing device 100 is connected to each of the NW 20-1 and the NW 20-2.

The packet processing device 100 includes a packet reception unit 110 configured to receive information transmitted as packets in real time from each terminal 10, a packet processing unit 120 configured to process packets transmitted in real time from the other terminal 10 using the received packets alone or a combination of a plurality of pieces of information, and a packet transmission unit 130 configured to transmit the processed packet to the communication device 30 connected to each of the NW 20-1 and the NW 20-2. The packet processing device 100 may be implemented in any form and may operate in either hardware as an NW device or software operating on an existing NW device.

It is assumed that the packet processing device 100 can calculate a time at which the information of each terminal 10 has been packetized from the timestamp of the packet transmitted by each terminal 10. The condition for calculation in the packet processing device 100 of a time at which the information of each terminal 10 has been packetized is the case in which a format of the time stamp of each terminal 10 is known in the packet processing device 100, and each terminal 10 is synchronized in time by network time protocol (NTP) broadcasting of the packet processing device 100, for example. Alternatively, even when each terminal 10 and the packet processing device 100 are not synchronized in time, a test packet, for example, may be periodically transmitted and received between each terminal 10 and the packet processing device 100, a time from the packetization in each terminal 10 to the reception in the packet processing device 100 may be estimated, and a time at which the information of each terminal 10 that has been packetized and adjusted for the packet processing device 100, may be calculated by the packet processing device 100.

Figure 3:
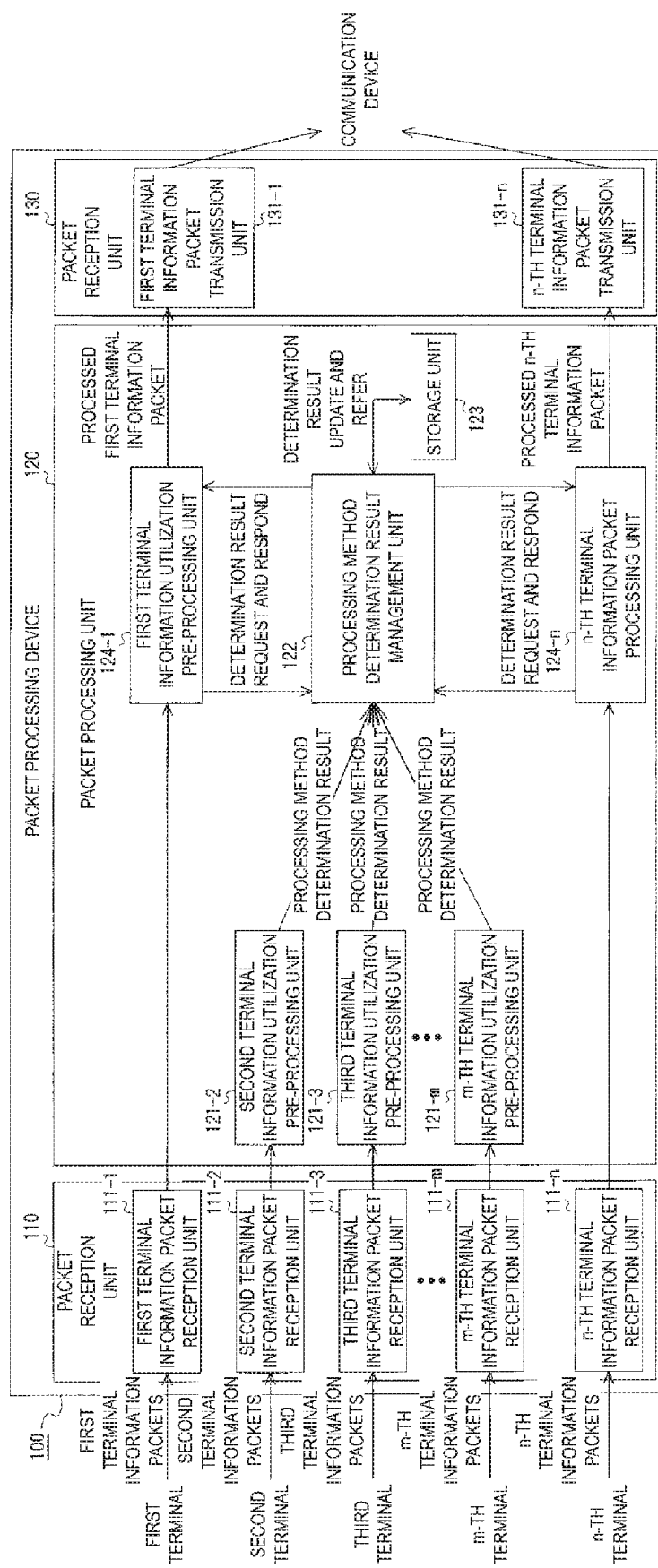
FIG. 3 is a functional block diagram of a packet processing device.

Next, details of the packet processing device 100 will be described with reference to FIG. 3. FIG. 3 is a functional block diagram of the packet processing device.

The packet processing device 100 includes functional blocks illustrated in FIG. 3. The packet processing device 100 performs packet processing using information transmitted in real time from the other terminals 10-2, 10-3, . . . , 10-$m$ on packets transmitted in real time from the terminals 10-1 and 10-$n$ per packet unit, and then transmits the processed packets to the communication device 30 to thereby "change" a flow of packets that are transmitted to the NW 20-2 in FIG. 2.

Here, "change" refers to the following points. The first point is, for example, that the packet processing device 100 discards packets that do not need to be transmitted to the communication device 30 due to problems such as quality of packetized information, to thereby reduce use of an unnecessary NW band or a processing load of the communication device 30. The second point is that, when the packet processing device 100 has received a packet including information essential to a process of the communication device 30, the packet processing device 100 copies the packet and transmits the packet to the communication device 30, thereby increasing a packet reception success rate on the reception side in packet transmission and reception via a low-quality NW with a packet loss or the like, resulting in improved availability of information on the reception side. That is, this change provides an advantage for the side using each terminal 10, the communication device 30, and the NW 20-1 and the NW 20-2 to which each terminal 10 and the communication device 30 are connected.

FIG. 3 illustrates a functional block necessary when packets of information transmitted in real time from the terminal 10-1 or the terminal 10-$n$ are processed using information transmitted in real time from the terminal 10-2, the terminal 10-3, and the terminal 10-$m$ alone or a combination thereof. Here, it should be noted that the terminal 10-1 and the terminal 10-$n$ correspond to a "first terminal" in the description of the claims, and the terminal 10-2, . . . , terminal 10-$m$ correspond to a "second terminal" in the description of the claims.

As illustrated in FIG. 3, the packet reception unit 110 of the packet processing device 100 includes terminal information packet reception units 111-1 to 111-$n$ configured to receive packets from the respective terminals 10-1 to 10-$n$. The packet processing unit 120 of the packet processing device includes terminal information utilization pre-processing units 121-2, 121-3, . . . , 121-$m$, a processing method determination result management unit 122, a storage unit 123, and terminal information packet processing units 124-1 and 124-$n$. The packet transmission unit 130 of the packet processing device 100 includes terminal information packet transmission units 131-1 and 131-$n$ configured to transmit processed terminal information packets that has been processed by the packet processing unit 120. Hereinafter, details of the packet processing unit 120 will be described.

The terminal information utilization pre-processing units 121-2, 121-3, . . . , 121-$m$ determine a method of processing the packets of the information transmitted in real time from the terminal 10-1 or the terminal 10-$n$ per packet unit, based on the information transmitted in real time from the terminals 10-2, 10-3, . . . , 10$m$. A packet processing method determination result is transferred to the processing method determination result management unit 122. Here, examples of the processing method may include "transmission (transmitting information as it is without processing)," and "disposal." The determination of the method of processing the packets is performed according to a type and attribute of information relevant to the packets, relevance with information transmitted by the terminal 10-1 or 10-$n$ which is processing target, or the like. For example, a determination process is performed based on a specific parameter included in the information of the packet, and a predetermined threshold value. Time information included in the packet is included in the determination result that is delivered to the processing method determination result management unit 122.

The processing method determination result management unit 122 stores the transferred processing method determination result as a processing method determination table in the storage unit 123, or updates the processing method determination table stored in the storage unit 123. Further, the processing method determination result management unit 122 generates a processing method determination list based on the processing method determination table, and stores the processing method determination list in the storage unit 123, or updates the processing method determination list stored in the storage unit 123. Further, when the processing method determination result management unit 122 receives a request for the packet processing method determination results from the terminal information packet processing units 124-1 and 124-*n*, the processing method determination result management unit 122 responds with the packet processing method determination results based on the processing method determination list stored in the storage unit 123.

An example of the processing method determination table stored in the storage unit 123 is illustrated in FIG. 4. The processing method determination table is stored for each of the terminals 10-1 and 10-*n* which are processing targets, and for each of the terminals 10-2, 10-3, . . . , 10*m* used for a processing determination. FIG. 4 illustrates the processing method determination table for the terminal 10-1, and illustrates a case in which a process is performed using information from the terminal 10-2. As described above, each terminal 10 periodically transmits a packet. In FIG. 4, it is assumed that the terminal 10-2 transmits a packet at a period of 1/fx. Further, in FIG. 4, "transmission" and "disposal" are illustrated as processing methods. As illustrated in FIG. 4, the processing method determination table is a table in which a processing method determination result based on a packet received from the terminal 10-2 is associated with time information of the packet. Data in the processing method determination table stored in the storage unit 123 is sequentially additionally written or updated each time the determination results are received from the terminal information utilization pre-processing units 121-2, 121-3, . . . , 121-*m* in other words, each time packets are received from the terminals 10-2, 10-3, . . . , 10-*m*. It should be noted that the packets may be missing or an order of packet receptions may be reversed.

Figure 5:
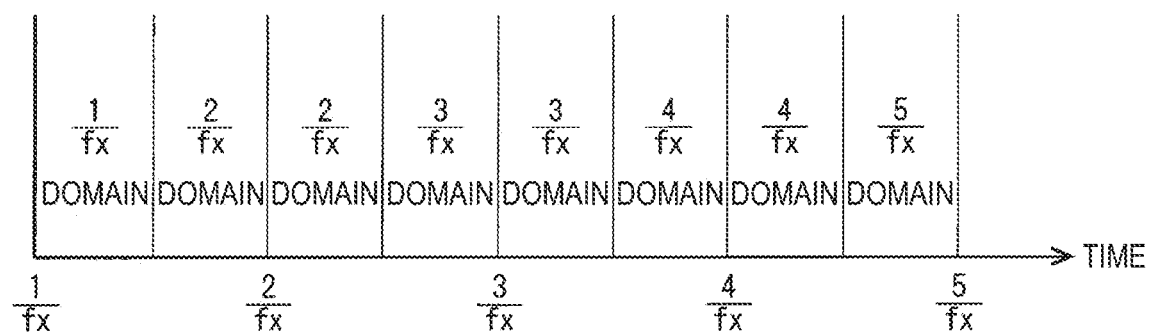
FIG. 5 is an example of a data structure of a processing method list.

An example of a data structure of the processing method list is illustrated in FIG. 5. The processing method list is stored for each of the terminals 10-1 and 10-*n* which are processing targets. The processing method list is generated and updated based on the processing method determination table. In the processing method list, a method of processing the packets received from the terminals 10-1 and 10-*n* per packet unit according to a predetermined rule is associated with the time information.

Figure 6:
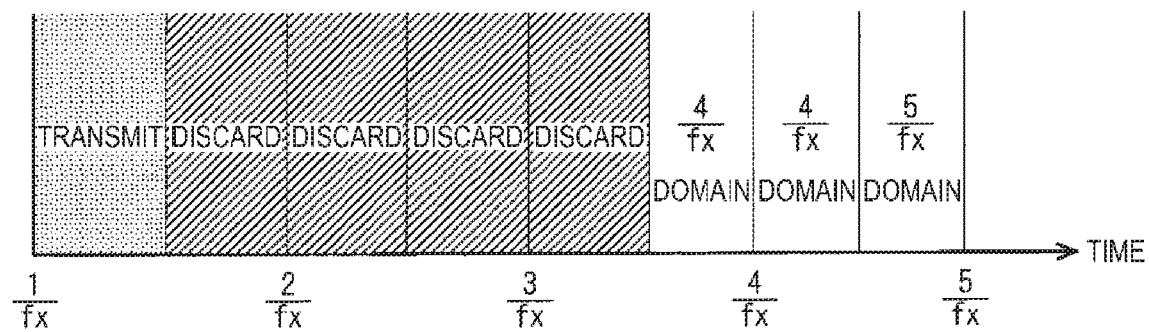
FIG. 6 is an example of the processing method list.

Incidentally, because each terminal 10 periodically transmits packets, the processing method determination result based on information transmitted by certain terminals 10-2, 10-3, . . . , 10-*m* is normally transferred periodically to the processing method determination result management unit 122. When a frequency of the terminal 10-2 is f, the processing method determination result management unit 122 creates the processing method list so that the processing method determination result management unit 122 can respond with the processing method determination result closest to the time when the processing method determination result management unit 122 receives a request for the processing method determination result at a certain time from the terminal information packet processing unit 10-1, which is a processing target. That is, the processing method determination result management unit 122 determines the processing method in a time domain between respective times from the time information of the plurality of determination results from the terminals 10-2, 10-3, . . . , 10-*m* used for the processing determination, to generate the processing method list. FIG. 5 illustrates an example of a data structure when a determination method list is generated based on a determination result relevant to one terminal 10-2. FIG. 6 illustrates an example in which the processing method list is generated based on the processing method determination table illustrated in FIG. 4. As illustrated in FIG. 5 and FIG. 6, the processing method list is matched with a transmission period of the terminal 10-2 that transmits information serving as a basis of a determination of a method of processing information packets of the terminal 10-1, and half of the transmission period of the terminal 10-2 is set as a minimum unit in order to use a determination result at a close time as a processing method determination result for the information packets of the terminal 10-1.

In order to avoid an increase in a required capacity of the storage unit 123 to infinity, a time for which the processing method determination result or the processing method list is held in the storage unit 123 may be limited in consideration of a real time property required for the packets of information transmitted in real time from the terminal 10-1 or the terminal 10-*n*.

When the terminal information packet processing units 124-1 and 124-*n* have received the packets, the terminal information packet processing units 124-1 and 124-*n* request the processing method determination result management unit 122 to provide the packet processing method determination result, process the packets per packet unit based on a response result, and transfer the resultant packets to the terminal information packet transmission units 131-1 and 131-*n*. The terminal information packet transmission units 131-1 and 131-*n* transmit the packets received from the terminal information packet processing units 124-1 and 124-*n* to the communication device 30.

Figure 7:
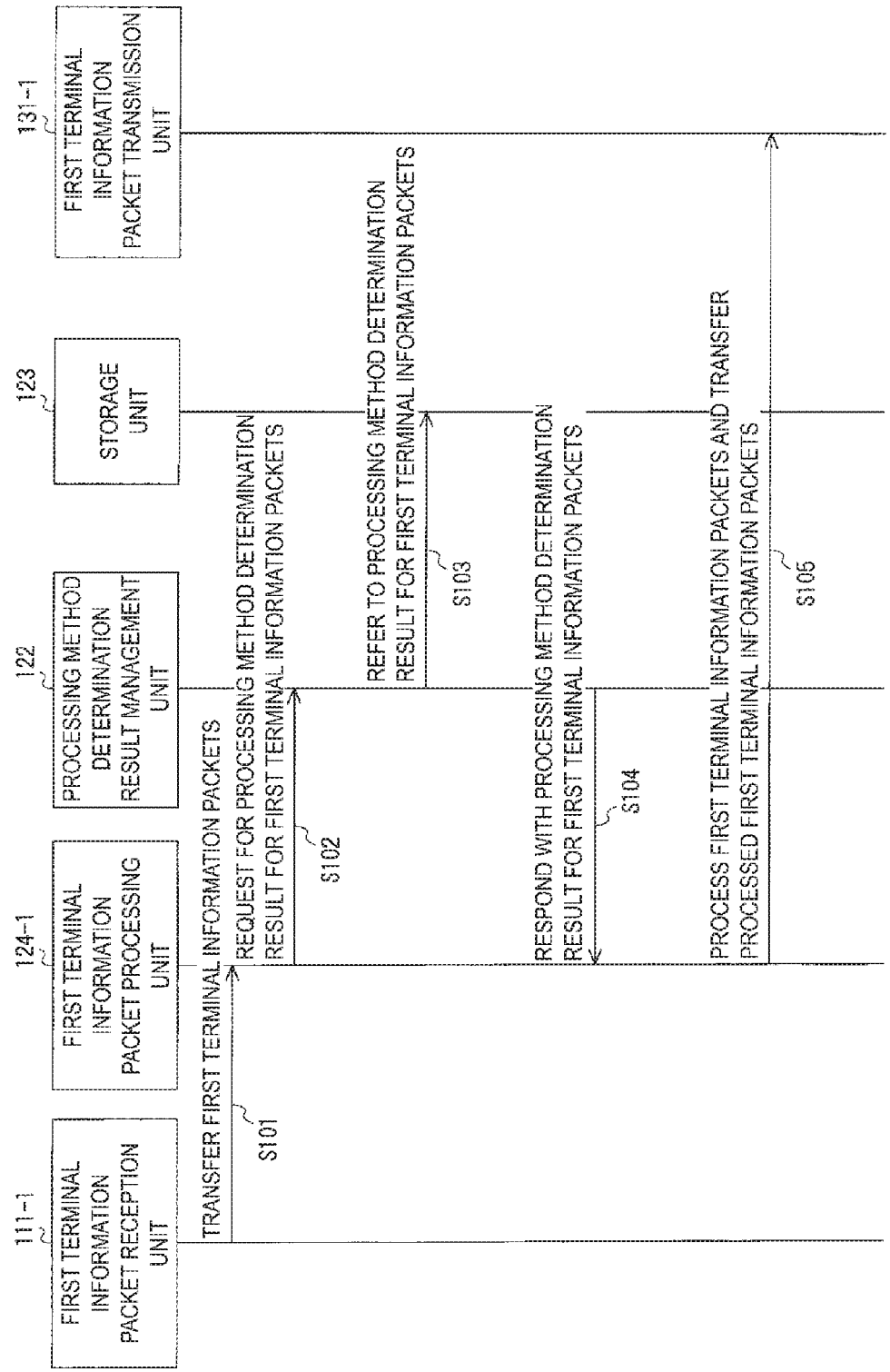
FIG. 7 is a sequence chart of packet processing in the packet processing device.

Processing of the terminal information packets of the terminal information packet processing units 124-1 and 12-4 is executed according to a sequence illustrated in FIG. 7. In the example of FIG. 7, packets transmitted by the terminal 10-1 are targeted.

When the information packets relevant to the terminal 10-1 are transferred from the terminal information packet reception unit 121-1, the terminal information packet processing unit 124-1 requests the processing method determination result management unit 122 to provide the packet processing method determination result (steps S101 and S102). The processing method determination result management unit 122 responds to the terminal information packet processing unit 124-1 with the processing method determination result for the packets relevant to the terminal 10-1 by referring to the processing method determination list for the packets relevant to the terminal 10-1 stored in the storage unit 123 (steps S103 and S104). The terminal information packet processing unit 124-1 processes the packets transmitted from the terminal 10-1 per packet unit based on a response result, and transfers the processed packet to the terminal information packet transmission unit 131-1 (step S105).

Next, an operation of the processing method determination result management unit 122 will be described with reference to a flowchart of FIG. 8. An operation of updating the processing method determination table and the processing method list for processing the packets from the terminal 10-1 based on the packets from the terminal 10-2 will be described herein. Here, the terminal 10-2 transmits a packet at a frequency fx, and the terminal 10-1 transmits a packet at a frequency fy different from the frequency fx.

Figure 8:
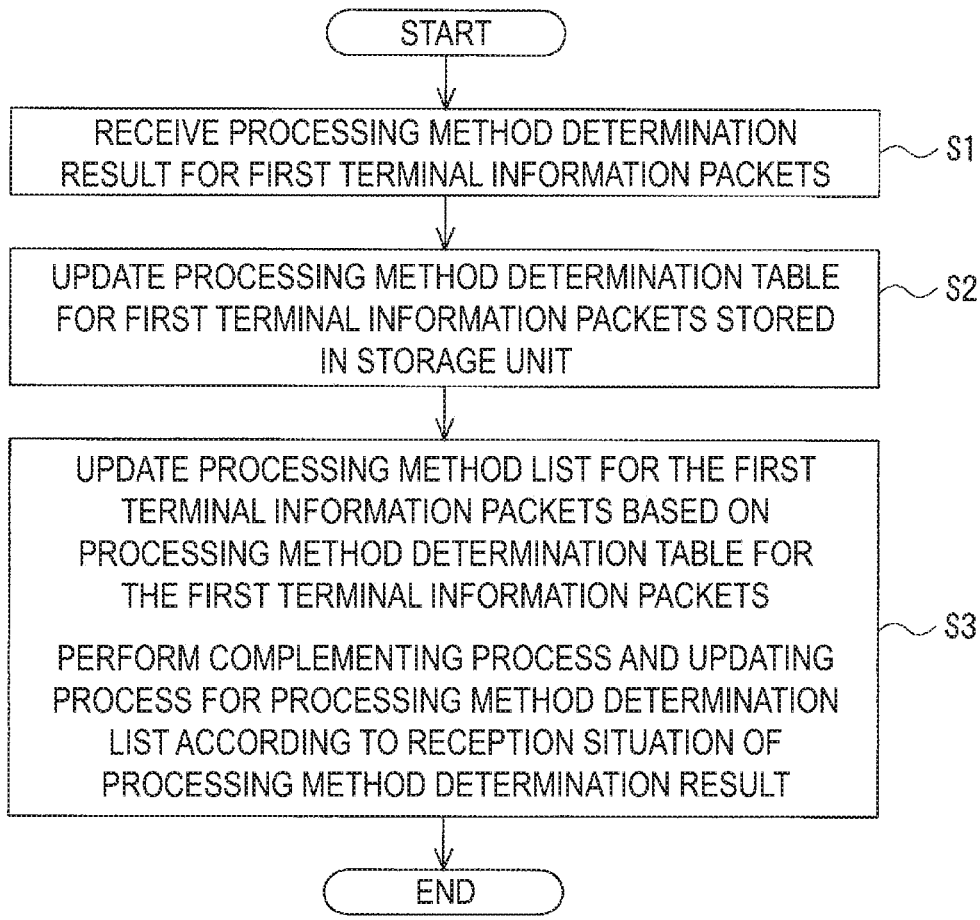
FIG. 8 is a flowchart of a processing method determination result management unit.

As illustrated in FIG. 8, when the processing method determination result management unit 122 receives the processing method determination result for the information packets of the terminal 10-1 from the terminal information utilization pre-processing unit 10-2 (step S1), the processing method determination result management unit 122 updates the processing method determination table for the information packets of the terminal 10-1 stored in the storage unit 123 (step S2). The processing method determination result management unit 122 updates the processing method list for the information packets of the terminal 10-1 according to a predetermined rule based on the processing method determination table (step S3).

Here, the processing method determination result management unit 122 can perform a complementing process or the updating process of the processing method determination list according to a reception situation of the processing method determination result from the terminal information utilization pre-processing unit 10-2. Normally, the determination results are received periodically in time series without missing from the terminal information utilization pre-processing unit 10-2 by the processing method determination result management unit 122. The processing method determination table in FIG. 4 and the processing method list in FIG. 6 described above are a processing method determination table and a processing method list at a point in time when the determination results relevant to time 1/x, 2/fx, and 3/fx have been received sequentially without missing.

Figure 10:
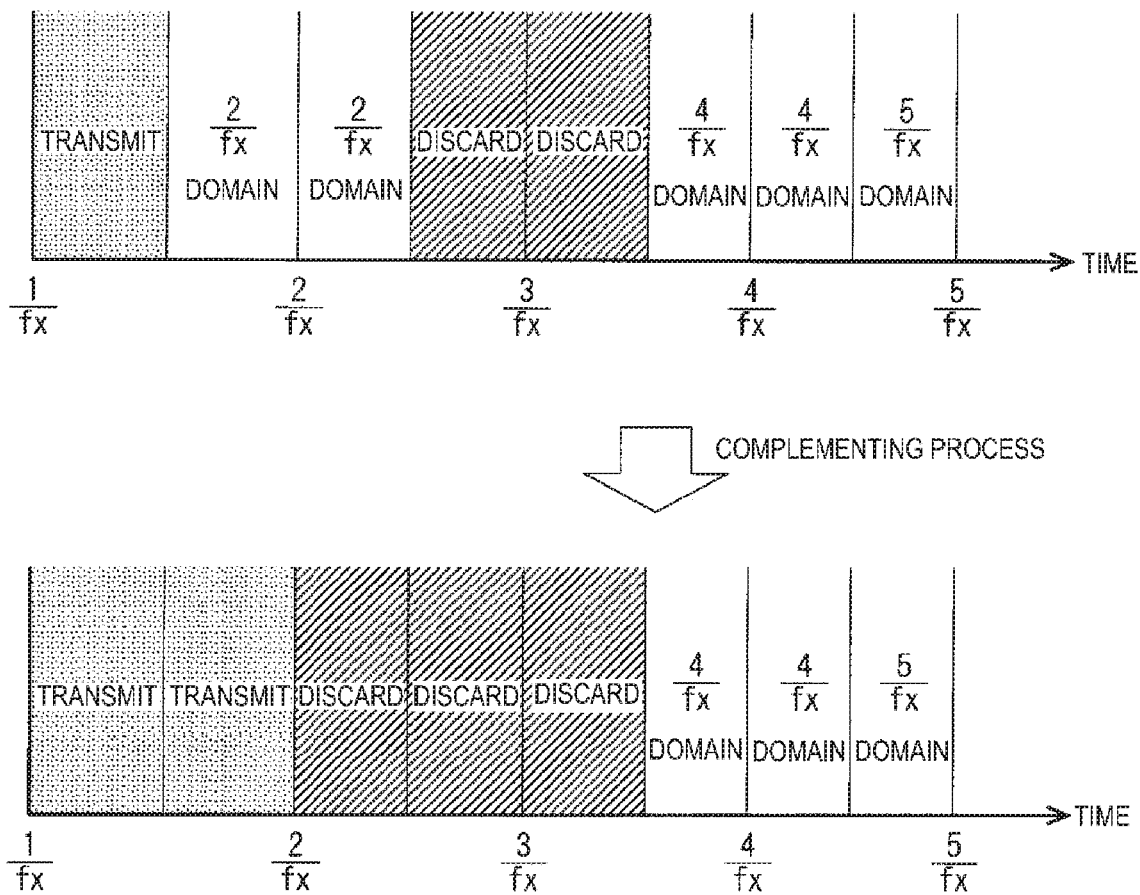
FIG. 10 is a diagram illustrating a complementing process of the processing method list.

On the other hand, when some of the determination results that are periodically transferred are missing, the processing method determination result management unit 122 updates the processing method determination table so that the determination results are partially missing. The processing method determination result management unit 122 can complement a time domain relevant to the missing determination result with the same processing method determination result as in the closest time domain. FIG. 9 illustrates a processing method determination table when the determination result at time 2/fx N is missing. FIG. 10 illustrates a complementing process of the processing method list when the determination result at time 2/fx is missing. As another complementing process, complementation can be performed using a predetermined processing method at the time of missing. The complementing process may not be performed.

Figure 11:
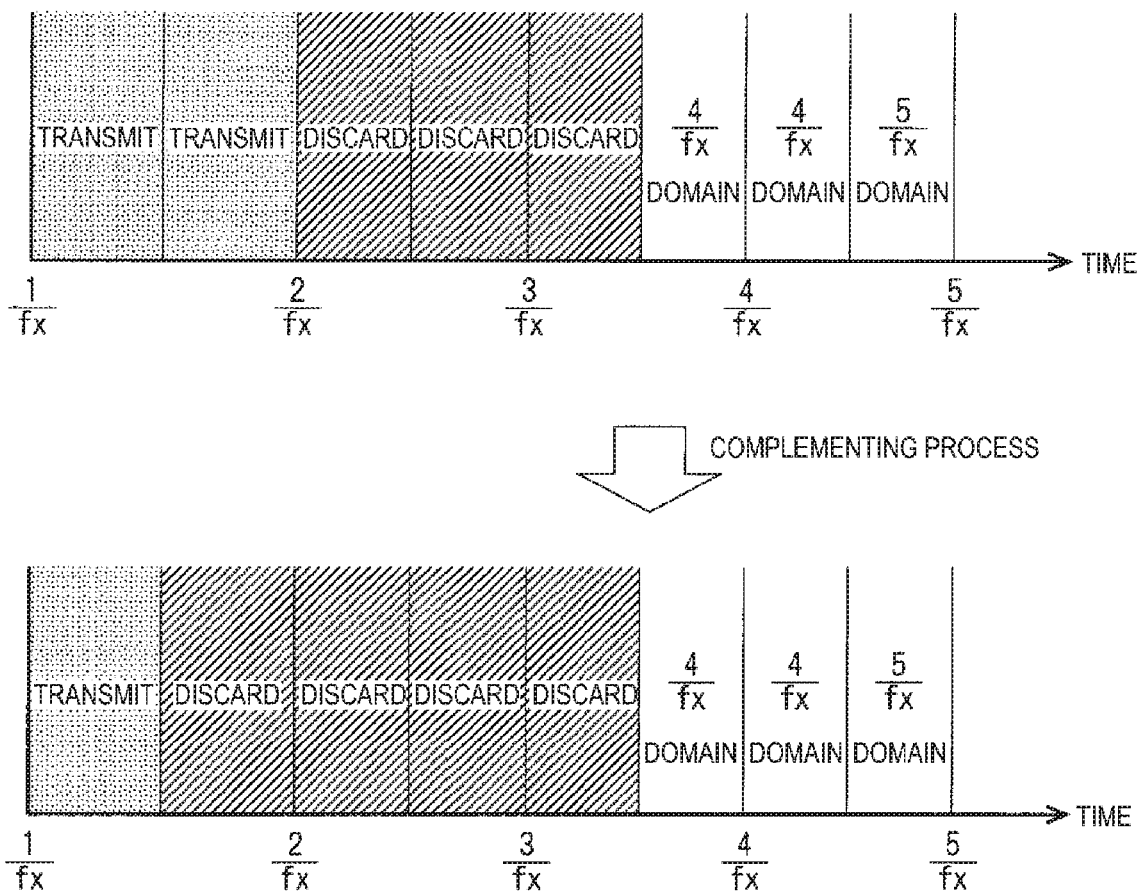
FIG. 11 is a diagram illustrating an updating process of the processing method list.
Figure 12:
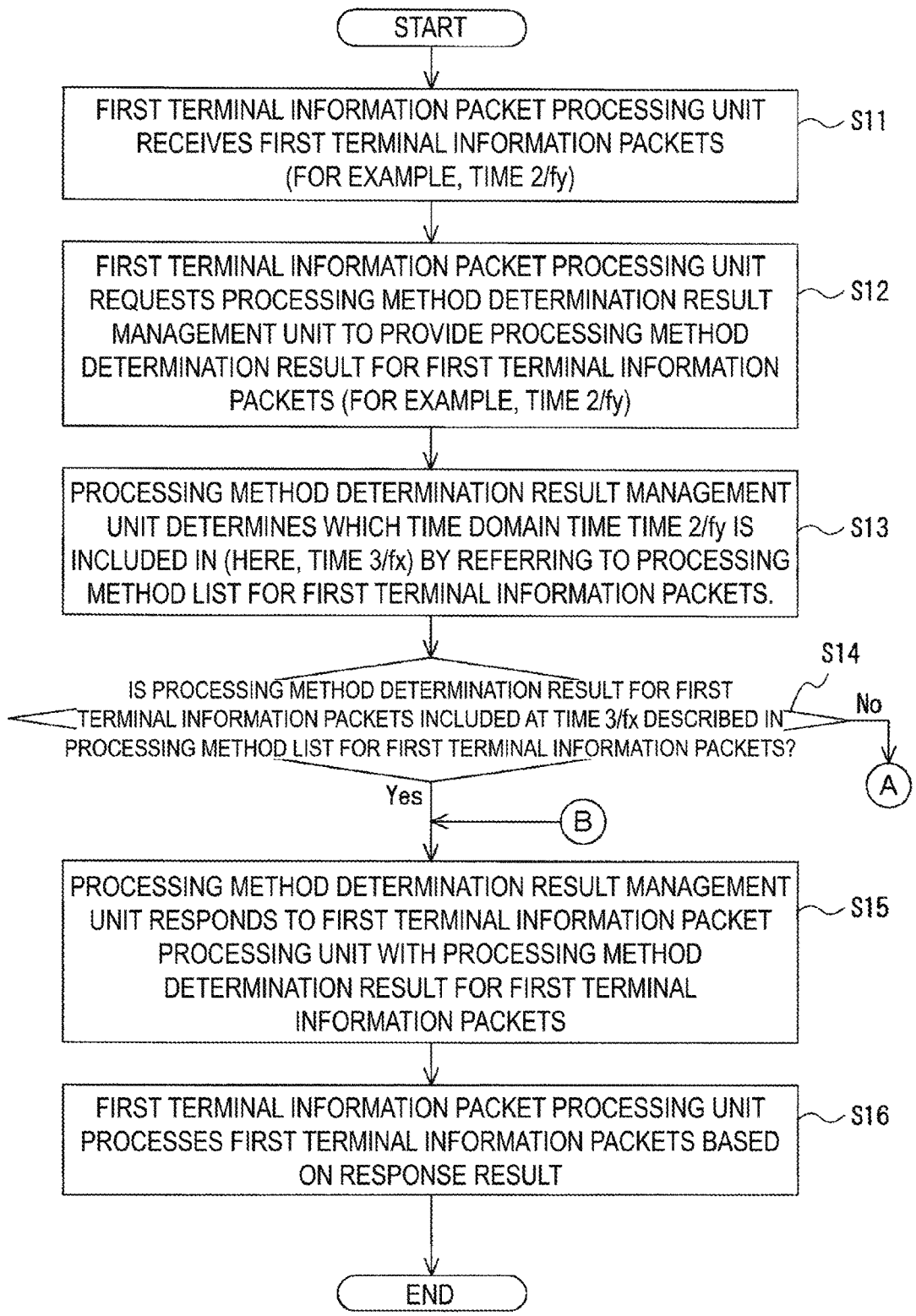
FIG. 12 is a flowchart (1/2) of a terminal information packet processing unit

The processing method determination result management unit 122 can update the processing method determination table with respect to the determination results received later when an order of the transferred determination results has been reversed, and update the processing method list when the processing method list corresponding to the time information of the determination result is not described. FIG. 11 illustrates a processing method list when a determination result at time 2/fx is received after a determination result at time 3/fx. FIG. 12 illustrates an updating process of the processing method list when the determination result at time 2/fx has been received after the determination result at time 3/fx. As another updating process, it is possible to overwrite the processing method determination result in all cases regardless of presence or absence of description of the processing method list. As a still another updating process, it is possible to overwrite only when the described processing method determination result indicates a certain specific process.

Figure 13:
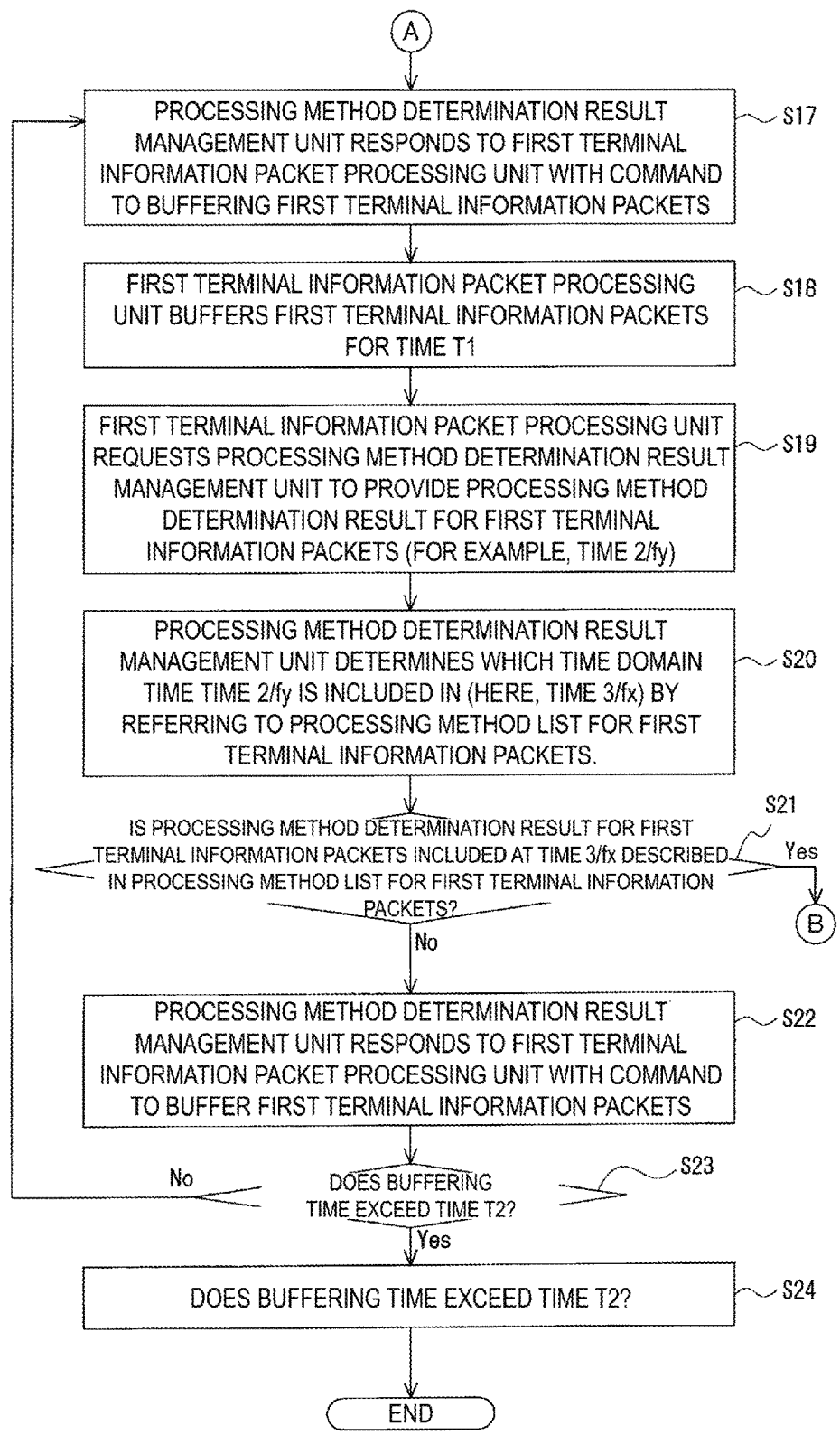
FIG. 13 is a flowchart (2/2) of the terminal information packet processing unit

Next, a procedure for processing packets from the terminal 10, which is a processing target of the terminal information packet processing unit 124 and the processing method determination result management unit 122 will be described with reference to FIG. 13. When the terminal 10-1 is transmitting the packet at the frequency fy, the terminal information packet processing unit 124-1 normally receives the information packet at a time interval of 1/fy (step S11). When the terminal information packet processing unit 124-1 receives the information packet at a certain time (time 2/fy in FIG. 13), the terminal information packet processing unit 124-1 requests the processing method determination result management unit 122 to provide processing method determination result for the information packets of the terminal 10-1 at the time 2/fy (step S12).

The processing method determination result management unit 122 determines whether the information packets of the terminal 10-1 at time 2/fy is included in a certain time domain of the processing method list (step S13). In FIG. 13, a time is 3/fx. When the processing method determination result for the information packets of the terminal 10-1 included at the time 3/fx is described in the processing method list, the processing method determination result management unit 122 responds to the terminal information packet processing unit 124-1 with the processing method determination result (step S14 and S15). The terminal information packet processing unit 124 processes the information packets of the terminal 10-1 based on a response result (step S16).

On the other hand, when the processing method determination result for the information packets of the terminal 10-1 included at the time 3/fx is not described in the processing method list, the processing method determination result management unit 122 responds to the terminal information packet processing unit 124-1 with a command to buffer the information packet (step S14 and S17). The terminal information packet processing unit 124-1 buffers the information packets based on a response result (step S18).

Here, a buffering time T1 can beset as a fixed value in advance, arbitrarily or by referring to a packet transmission period of a state information transmission device, as long as the buffering time T1 is in a range in which the real time property required for the information packets of the terminal 10-1, which is processing target, is not impaired. Alternatively, the buffering time T1 may be set to change according to a state of the NW each time, as a delay time of the NW between the terminal 10-1 and the packet processing device 100 from the time stamp of the periodically received information packets from the terminal 10-1 is learned and a variation therein is estimated.

After buffering for the time T1, the terminal information packet processing unit 124-1 requests the processing method determination result management unit 122 to provide the processing method determination result for the information packets again (step S19). In a case in which the processing method determination result included at time 3/fx is not described in the processing method list even when the terminal information packet processing unit 124-1 requests the processing method determination result management unit 122 to provide the processing method determination result again, the processing method determination result management unit 122 responds to the terminal information packet processing unit 124-1 with the command to buffer the information packet again (steps S20 to S22).

The terminal information packet processing unit 124-1 buffers the information packet again when a buffering time of the information packet does not exceed a time T2 at the time of reception of the command, and processes the packets according to a rule determined for the information packets in advance (for example, disposal of the packets) when the buffering time of the information packet exceeds the time T2 (steps S23 and S24).

Here, the time T2 can be set as a fixed value in advance, arbitrarily or by referring to the packet transmission period of the state information transmission device, as long as the time T2 is in the range in which the real time property required for the information packets of the terminal 10-1, which is processing target, is not impaired. Alternatively, the time T2 may be set to change according to a state of the NW each time, as a delay time of the NW between the terminal 10-1 and the packet processing device 100 from the time stamp of the periodically received information packets from the terminal 10-1 is learned and a variation therein is estimated. However, the time T2 is a value satisfying time T2≥time T1, regardless of the time T2 being either a fixed value or a variation value.

Because information is transmitted in real time from the terminal 10-2, the processing method list for the information packets of the terminal 10-1 stored in the storage unit 123 is updated at any time. In a case where the processing method determination result for the information packets that are being buffered is described in the processing method determination list of the storage unit 123 while the information packets of the terminal 10-1 are being buffered, the information packets can be processed based on the described processing method determination result. Packet processing according to a predetermined rule does not frequently occur as long as an NW through which a packet including information serving as a basis of determination of the method of processing the packets passes is not much worse than an NW through which the packet on the processed side, that is, the information packets of the terminal 10-1 herein passes.

Next, a case in which a method of processing the information packets of the terminals 10-1 and 10-$n$ is determined using a plurality of different pieces of information will be described with reference to FIG. 14 and FIG. 15. An example in which a method of processing information packets of the terminal 10-1 is determined based on information that is transmitted from the terminal 10-2 with a transmission period of 1/fa and the terminal 10-3 with a transmission period of 1/fb will be described herein. Here, it is assumed that a transmission period 1/fa of the terminal 10-2>a transmission period 1/fb of the terminal 10-3.

The processing method determination result management unit 122 individually generates a processing method determination table for the information packets of the terminal 10-1, for each of the terminals 10-2 and 10-3, as illustrated in FIG. 14. The processing method determination result management unit 122 generates one processing method list for information packets of the terminal 10-1 from the two processing method determination tables based on a predetermined rule. The processing method determination result management unit 122 takes a format, in which halves of transmission periods of the packets of the terminal 10-2 and of the terminal 10-3 are each used as segments, and a time domain is sectioned by respective segments, as illustrated in FIG. 15, thereby determining whether the processing method determination result for the information packets of the terminal 10-1 at a certain time is derived by a combination of pieces of information of certain terminals 10-2 and terminal 10-3. Examples of a method of the derivation include a method of preparing a correspondence table in which a processing method has been assigned to a set of the determination result relevant to the terminal 10-2 and the determination results relevant to the terminal 10-3 in advance, and referring to this correspondence table.

The processing method determination result may be described in each time domain of the processing method list when the processing method determination result according to some of termination information has been transferred or when the processing method determination result according to all of terminal information have been transferred.

As described above, with the packet processing system according to the embodiment, it is possible to establish a temporal corresponding relationship between the packets of the information transmitted in real time from the terminals 10-1 and 10-$n$ and the information transmitted in real time from the other terminals 10-2, 10-3, . . . , 10-$m$, and then, perform processing in real time using such information.

Further, when the processing method in the packet processing device 100 has been determined, the packets on the processed side is processed without being buffered when received in the packet processing device 100. Only when the processing method in the packet processing device 100 is not determined, the packets on the processed side is buffered in a range of a real time property required for the packets on the processed side. Thus, according to the present invention, it is possible to reduce a transfer delay as much as possible, thereby minimizing impairment of a real-time property. And thus it is possible to decrease a delay of an overall system in an end-to-end view, to solve a problem of an increase in an unnecessary delay when related art as described in Patent Literature 1 as a result, and to enable real-time packet processing using the information associated in the temporal corresponding relationship. Because the packet processing in the present invention is processing at a packet level rather than processing of a payload of a packet on the processed side, it is possible to process information with a large processing load, such as image information, in real time with a small load.

Hereinafter, examples of the packet processing system according to the present invention will be described.

Example 1

Figure 16:
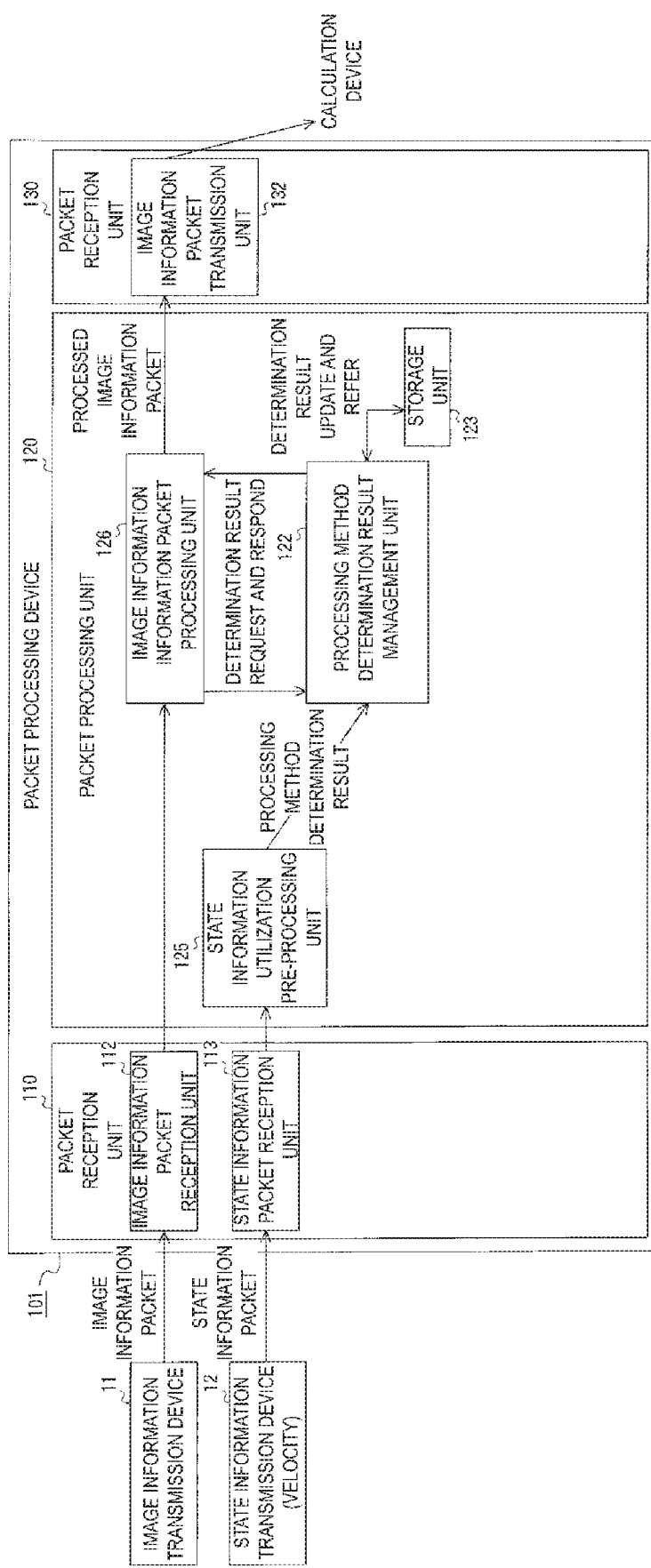
FIG. 16 is a functional block diagram illustrating a packet processing device according to Example 1.

Example 1 is an example in which the packet processing system of the present invention has been applied to an image information transmission system that transmits image information from a terminal to a communication device. A system according to Example 1 will be described with reference to FIG. 16. FIG. 16 is a configuration diagram of an image information transmission system according to Example 1.

In this image information transmission system, image information packets transmitted from an image information transmission device 11, such as a camera terminal, are processing targets. That is, the image information transmission device 11 corresponds to the terminal 10-1 described above, and corresponds to a "first terminal" described in the claims. In Example 1, the image information transmission device 11 packetizes image information and transmits image information packets at a period 1/fy. The packet processing device 101 according to Example 1 performs a process of discarding or transmitting the image information packet.

For the determination of the method of processing the image information packets, state information transmitted from a state information transmission device 12 such as a terminal other than a camera, which may be a velocity sensor affiliated with the camera is used. That is, the state information transmission device 12 corresponds to the terminal 10-2 described above, and corresponds to a "second terminal" described in the claims. The state information is information indicating a state that influences an imaging state of the image information. In the present example, the state information transmission device 12 packetizes a velocity Vt at time t and transmits a state information packet at a period 1/fx.

In Example 1, a predetermined velocity threshold value Vsh is used as a reference. The image information from the image information transmission device 11 having a velocity exceeding the threshold value as a state is degraded in quality due to shake or the like. This image information does not need to be transferred to the calculation device (corresponding to the communication device 30 described above) and is "discarded". The image information from the image information transmission device 11 having a velocity equal to or lower than the threshold value as a state is "transmitted", that is, transferred to the calculation device as it is.

The packet reception unit 110 of the packet processing device 101 includes an image information packet reception unit 112 configured to receive the image information packet from the image information transmission device 11, and a state information packet reception unit 113 configured to receive the state information packet from the state information transmission device 12. The image information packet reception unit 112 corresponds to the terminal information packet reception unit 111-1 described above, the state information packet reception unit 113 corresponds to the terminal information packet reception unit 111-2 described above.

The packet processing unit 120 of the packet processing device 101 includes a state information utilization pre-processing unit 125, a processing method determination result management unit 122, a storage unit 123, and an image information packet processing unit 126. The state information utilization pre-processing unit 125 corresponds to the terminal information utilization pre-processing unit 121-2 described above. The image information packet processing unit 126 corresponds to the terminal information packet processing unit 124-1.

The packet transmission unit 130 of the packet processing device 101 includes an image information packet transmission unit 132 configured to transmit the processed image information packet processed by the image information packet processing unit 126 to the calculation device. The image information packet transmission unit 132 corresponds to the terminal information packet transmission unit 131-1 described above.

Because the respective units of the packet processing device 101 according to Example 1 perform the same processes as those of the packet processing device 100 described above, description of the processes of the respective units will be omitted, and examples of processes or numerical values specific to the image information transmission system will be described.

Figure 17:
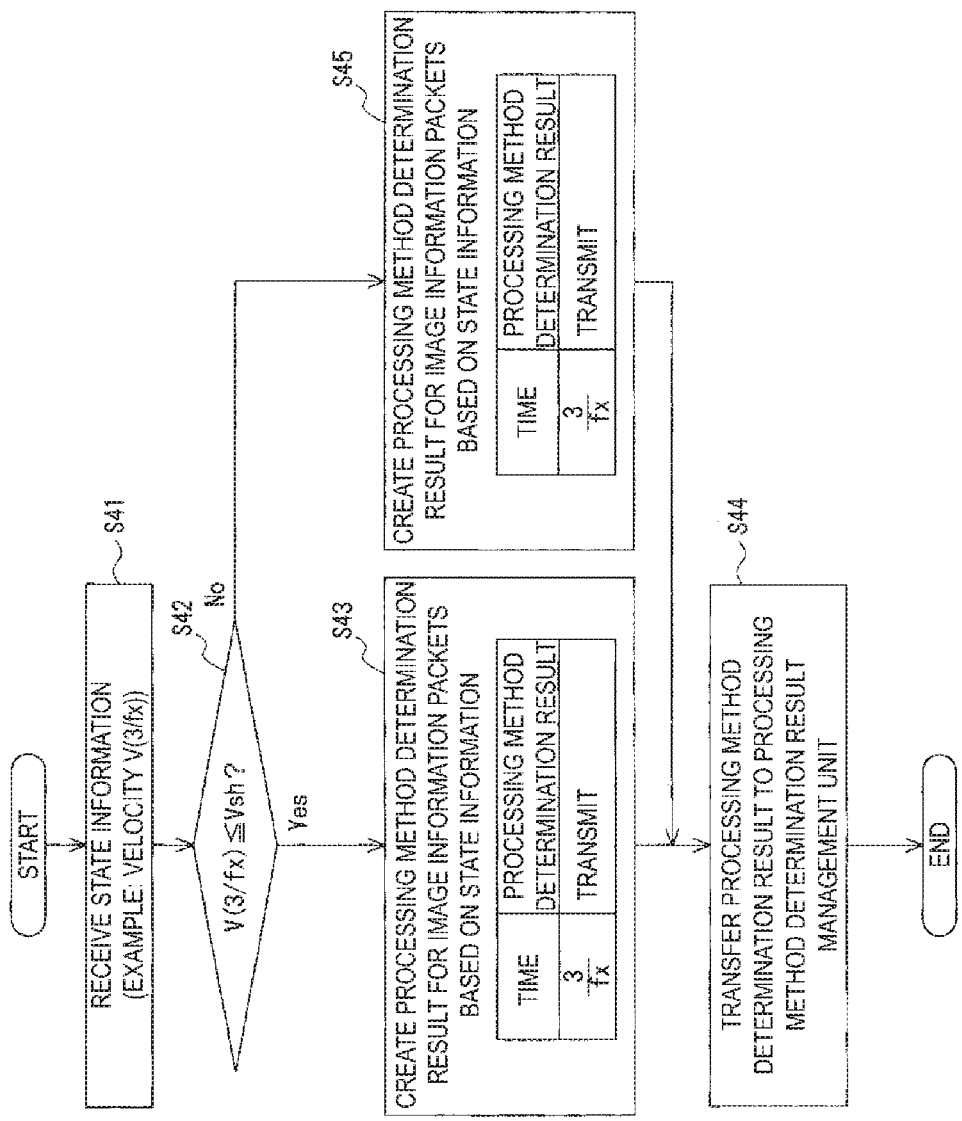
FIG. 17 illustrates an example of a processing method determination flow according to Example 1.

An operation of the state information utilization pre-processing unit 125 will be described with reference to FIG. 17. The state information utilization pre-processing unit 125 receives the state information packet from the state information transmission device 12 (step S41). Here, it is assumed that a velocity V(3/fx) has been received at time 3/fx. When the velocity V(3/fx) is equal to or lower than a predetermined threshold value Vsh, the state information utilization pre-processing unit 125 creates a determination result indicating that the processing method determination result is "transmission" for the time 3/fx, and transfers the determination result to the processing method determination result management unit 122 (steps S42 to S44). On the other hand, when the velocity V(3/fx) exceeds the predetermined threshold value Vsh, the state information utilization pre-processing unit 125 creates a determination result indicating that the processing method determination result is "discard" for the time 3/fx, and transfers the determination result to the processing method determination result management unit 122 (steps S42, S45, and S44).

The buffering time T1 in the image information packet processing unit 132 is, for example, about 10 ms, and the buffering timeout time T2 is, for example, about 30 ms.

As described above, in Example 1, because the image information acquired when the image information transmission device 11 moves at high velocity is poor in quality, and cannot be appropriately processed by the calculation device even when the image information is transmitted to the calculation device, it is possible to solve a problem of unnecessary generation of use of an NW band for transmission of the image information and a load of the calculation device for processing of the image information, by selectively discarding only image information packets that cannot be appropriately processed.

Example 2

Figure 18:
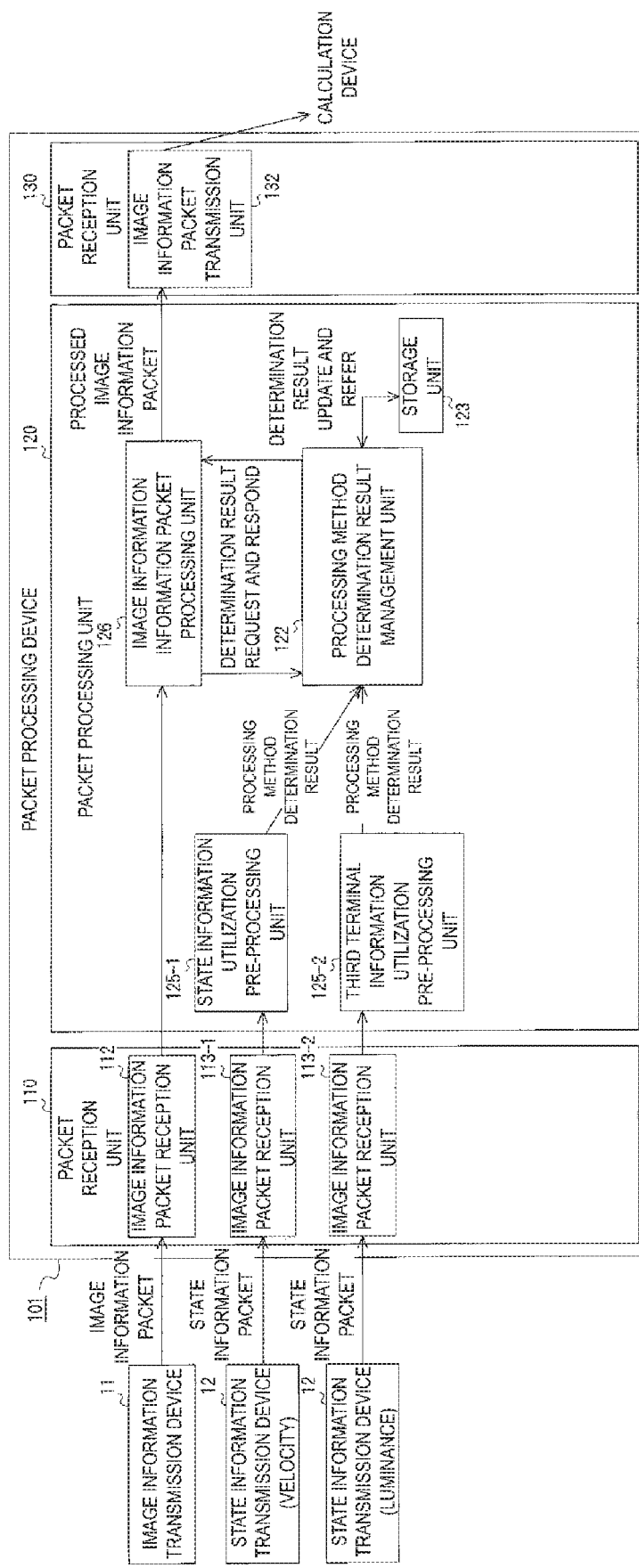
FIG. 18 is a functional block diagram illustrating a packet processing device according to Example 2.

Similar to Example 1, Example 2 is an example in which the packet processing system of the present invention has been applied to an image information transmission system that transmits image information from a terminal to a communication device. A system according to Example 2 will be described with reference to FIG. 18. FIG. 18 is a configuration diagram of an image information transmission system according to Example 2.

A difference between Example 2 and Example 1 described above is that two state information transmission devices that are used for a determination of the processing method for image information packets are included. That is, in Example 2, as a determination of the method of processing the image information packets, state information transmitted from the state information transmission device 12-1 such as a terminal other than the camera, which may be a velocity sensor affiliated with the camera, and state information transmitted from the state information transmission device 12-1 such as a luminance sensor is used in combination. The state information transmission devices 12-1 and 22-1 correspond to the terminal 10-2 described above, and corresponds to a "second terminal" in the claims. The state information is information indicating a state that influences an imaging state of the image information. In the example, the state information transmission device 12-1 packetizes the velocity Vt at time t and transmits the state information packet at a period 1/fa, and the state information transmission device 12-2 packetizes luminance Lt at time t and transmits the state information packet at a period 1/fb.

In Example 2, a predetermined velocity threshold value Vsh is used as a reference. The image information from the image information transmission device 11 having a velocity exceeding the threshold value as a state is degraded in quality due to shake or the like. This image information does not need to be transferred to the calculation device (corresponding to the communication device 30 described above) and is "discarded". The image information from the image information transmission device 11 having a velocity equal to or lower than the threshold value as a state is "transmitted", that is, transferred to the calculation device as it is.

Furthermore, in Example 2, predetermined luminance threshold values Lsh1 and Lsh2 (Lsh1<Lsh2) is used as references. The image information from the image information transmission device 11 exposed to luminance outside a threshold value range is degraded in quality due to darkness, glare, and the like. This image information does not need to be transferred to the calculation device (corresponding to the communication device 30 described above) and is "discarded". The image information from the image information transmission device 11 exposed to luminance within the threshold value range is "transmitted", that is, transferred to the calculation device as it is.

The packet reception unit 110 of the packet processing device 102 includes an image information packet reception unit 112 configured to receive image information packet from the image information transmission device 11, and state information packet reception units 113-1 and 113-2 configured to receive the state information packet from the state information transmission devices 12-1 and 22-2. The image information packet reception unit 112 corresponds to the terminal information packet reception unit 111-1 described above. The state information packet reception units 113-1 and 113-2 correspond to the terminal information packet reception units 111-2 and 111-3 described above.

The packet processing unit 120 of the packet processing device 102 includes two state information utilization pre-processing units 125-1 and 125-2, a processing method determination result management unit 122, a storage unit 123, and an image information packet processing unit 126. The state information utilization pre-processing units 125-1 and 125-2 correspond to the terminal information utilization pre-processing unit 121-2 and 121-3 described above. The image information packet processing unit 126 corresponds to the terminal information packet processing unit 124-1.

The packet transmission unit 130 of the packet processing device 102 includes an image information packet transmission unit 132 configured to transmit the processed image information packet processed by the image information packet processing unit 126 to the calculation device. The image information packet transmission unit 132 corresponds to the terminal information packet transmission unit 131-1 described above.

Because the respective units of the packet processing device 102 according to Example 2 perform the same processes as those of the packet processing device 100 described above, description of the processes of the respective units will be omitted, and examples of processes or numerical values specific to the image information transmission system will be described. Further, because the state information utilization pre-processing unit 125-1 that processes state information relevant to velocity information is the same as in Example 1 described above, description thereof will be omitted.

Figure 19:
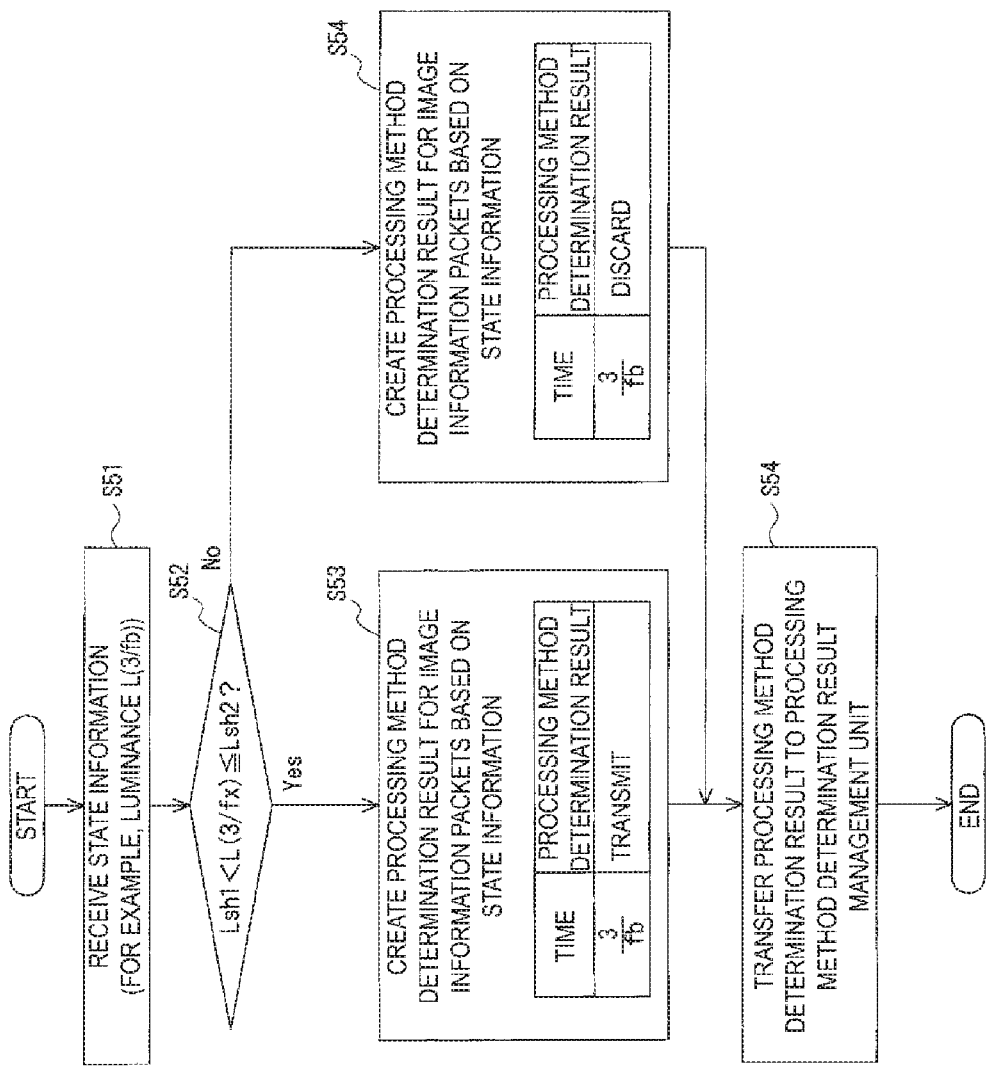
FIG. 19 illustrates an example of a processing method determination flow according to Example 2.

An operation of the state information utilization pre-processing unit 125-2 will be described with reference to FIG. 19. The state information utilization pre-processing unit 125-2 receives the state information packet from the state information transmission device 12-2 (step S51). Here, it is assumed that luminance L(3/fb) has been received at time 3/fx. When the luminance L(3/fb) is in a range of the predetermined threshold values Lsh1 and Lsh2, the state information utilization pre-processing unit 125 creates a determination result indicating that the processing method determination result is "transmission" for the time 3/fb, and transfers the determination result to the processing method determination result management unit 122 (steps S52 to S54). On the other hand, when the luminance L(3/fb) is not within the range of the predetermined threshold value Lsh1 and Lsh2, the state information utilization pre-processing unit 125 creates a determination result indicating that the processing method determination result is "discard" for the time 3/fb, and transfers the determination result to the processing method determination result management unit 122 (steps S52, S55, and S54).

When the processing method determination result management unit 122 receives the determination results from the respective state information utilization pre-processing units 125-1 and 125-2, the processing method determination result management unit 122 stores respective processing method determination tables in the storage unit 123. The processing method determination result management unit 122 determines the processing method based on the two processing method determination tables to generate and update the processing method list. In the determination of the processing method, a determination rule for the processing method based on the plurality of determination results from the respective state information utilization pre-processing units 125-1 and 125-2 is determined in advance, and the processing method is determined based on the determination rule. For example, the determination rule as a correspondence table as illustrated in FIG. 20 may be created in advance, and the processing method may be determined based on the correspondence table to create and update the processing method list. In the example of FIG. 20, a rule "disposal is prioritized between transmission and disposal of packets".

The buffering time T1 in the image information packet processing unit 132 is, for example, about 10 ms, and the buffering timeout time T2 is, for example, about 30 ms.

As described above, in Example 2, because the image information acquired when the image information transmission device 11 is at a dark place or a too bright place is poor in quality, and cannot be appropriately processed by the calculation device even when the image information is transmitted to the calculation device, it is possible to solve a problem of unnecessary generation of use of an NW band for transmission of the image information and a load of the calculation device for processing of the image information, by selectively discarding only image information packets that cannot be appropriately processed, in addition to operations and effects of Example 1.

The embodiment and the examples of the present invention have been described in detail above, but the present invention is not limited thereto. Although, for example, the packets transmitted from the image information transmission device are processing targets in the above example, the present invention can be applied to other types of packets as long as the packets are packets from a terminal that periodically transmits the packets in real time.

REFERENCE SIGNS LIST

10 Terminal
20 Network
30 Communication device
100 Packet processing device
110 Packet reception unit
120 Packet processing unit
121 Terminal information utilization pre-processing unit
122 Processing method determination result management unit
123 Storage unit
124 Terminal information packet processing unit
130 Packet transmission unit

The invention claimed is:

1. A packet processing system including a first terminal and a second terminal configured to transmit different data types of packets in real time, and a reception device configured to receive the packets transmitted from the first terminal, wherein the packet processing system includes a packet processing device disposed on a communication path of packets from the first terminal to the reception device, the first terminal and the second terminal include a packetization apparatus configured to append a time, at which a packetization process has been performed, to data and packetize the data, the packet processing device includes:

a packet processing method determination apparatus configured to determine a method of processing the packets received from the first terminal per packet unit based on data content of a second packet each time the second packet is received from the second terminal, and output the processing method per packet unit as a determination result associated with time information of the packet received from the first terminal;

a processing method determination result management apparatus configured to store the determination result as a packet processing method determination table each time the determination result is received from the packet processing method determination apparatus, and generate and store a processing method list in which a method of processing, per packet unit, the packets received from the first terminal according to a predetermined rule based on the packet processing method determination table is associated with the time information; and a packet processing apparatus configured to inquire of the processing method determination result management apparatus about a processing method for a packet each time the packet is received from the first terminal, and process the packet based on the processing method acquired from the processing method determination result management apparatus, and the processing method determination result management apparatus responds to the packet processing apparatus with the processing method associated with the time information by referring to the processing method list based on the time information of the packet in response to the inquiry from the packet processing apparatus.

2. The packet processing system according to claim 1, wherein, when the packet processing apparatus receives a response indicating that there is no processing method associated with the time information of the packet as a result of the inquiry to the processing method determination result management apparatus, the packet processing apparatus buffers the packet for a first predetermined time, and repeats a process of inquiring of the processing method determination result management apparatus about the processing method again after the first predetermined time has elapsed.

3. The packet processing system according to claim 2, wherein, when a response of the processing method is not obtained from the processing method determination result management apparatus even when a second predetermined time elapses after buffering is started, the packet processing apparatus processes the packets based on a predetermined rule.

4. The packet processing system according to claim 1, comprising:

a plurality of second terminals, and a plurality of packet processing method determination apparatus in correspondence to the plurality of second terminals, wherein the processing method determination result management apparatus stores a plurality of packet processing method determination tables in correspondence to the plurality of second terminals, and generates the processing method list corresponding to the first terminal based on the plurality of packet processing method determination tables.

5. The packet processing system according to claim 1, wherein the processing method determination result management apparatus determines, based on a plurality of determination results at different times in the packet processing method determination apparatus, a processing method in a time domain between respective times and generates the processing method list.

6. The packet processing system according to claim 1, wherein the first terminal is an image information transmission device configured to packetize captured image information and transmit resultant image information in real time, and the second terminal is a state information transmission device configured to packetize and transmit state information, the state information being information indicating a state influencing an imaging state of the image information.

7. A packet processing method in a packet processing system including a first terminal and a second terminal configured to transmit different data types of packets in real time, and a reception device configured to receive the packets transmitted from the first terminal, wherein the packet processing system includes a packet processing device disposed on a communication path of packets from the first terminal to the reception device, and the packet processing method comprises:

appending, by a packetization apparatus of each of the first terminal and the second terminal, a time at which a packetization process has been performed to data, and packetizing the data;

determining, by a packet processing method determination apparatus of the packet processing device, a method of processing the packets received from the first terminal per packet unit based on data content of a second packet each time the second packet is received from the second terminal, and outputting the processing method per packet unit as a determination result associated with time information of the packet received from the first terminal;

storing, by a processing method determination result management apparatus of the packet processing device, the determination result as a packet processing method determination table each time the determination result is received from the packet processing method determination apparatus, and generating and storing a processing method list in which a method of processing, per packet unit, the packets received from the first terminal according to a predetermined rule based on the packet processing method determination table is associated with the time information;

inquiring, by a packet processing apparatus of the packet processing device, of the processing method determination result management apparatus about a processing method for a packet each time the packet is received from the first terminal;

responding, by the processing method determination result management apparatus, to the packet processing apparatus with the processing method associated with the time information by referring to the processing method list based on the time information of the packet in response to the inquiry from the packet processing apparatus; and processing, by the packet processing apparatus, the packet based on the processing method acquired from the processing method determination result management apparatus.

8. The packet processing method according to claim 7, wherein, when the packet processing apparatus receives a response indicating that there is no processing method associated with the time information of the packet as a result of the inquiry to the processing method determination result management apparatus, the packet processing apparatus buffers the packet for a first predetermined time, and repeats a process of inquiring of the processing method determination result management apparatus about the processing method again after the first predetermined time has elapsed.

9. The packet processing method according to claim 8, wherein, when a response of the processing method is not obtained from the processing method determination result management apparatus even when a second predetermined time elapses after buffering is started, the packet processing apparatus processes the packets based on a predetermined rule.

10. The packet processing method according to claim 7, wherein the packet processing system further comprises:
    a plurality of second terminals, and
    a plurality of packet processing method determination apparatus in correspondence to the plurality of second terminals, wherein the processing method determination result management apparatus stores a plurality of packet processing method determination tables in correspondence to the plurality of second terminals, and generates the processing method list corresponding to the first terminal based on the plurality of packet processing method determination tables.

11. The packet processing method according to claim 7, wherein the processing method determination result management apparatus determines, based on a plurality of determination results at different times in the packet processing method determination apparatus, a processing method in a time domain between respective times and generates the processing method list.

12. The packet processing method according to claim 7, wherein
    the first terminal is an image information transmission device configured to packetize captured image information and transmit resultant image information in real time, and
    the second terminal is a state information transmission device configured to packetize and transmit state information, the state information being information indicating a state influencing an imaging state of the image information.

\* \* \* \* \*